D. L. LINDQUIST.
ALTERNATING CURRENT ELECTROMAGNETIC BRAKE APPARATUS.
APPLICATION FILED MAY 7, 1908.

1,102,522.

Patented July 7, 1914.

Witnesses:
Ernest L. Gale Jr.
James G. Bethell.

Inventor:
David L. Lindquist
By C. M. Niesen
Attorney

UNITED STATES PATENT OFFICE.

DAVID L. LINDQUIST, OF YONKERS, NEW YORK, ASSIGNOR TO OTIS ELEVATOR COMPANY, OF JERSEY CITY, NEW JERSEY, A CORPORATION OF NEW JERSEY.

ALTERNATING-CURRENT ELECTROMAGNETIC BRAKE APPARATUS.

1,102,522. Specification of Letters Patent. Patented July 7, 1914.

Application filed May 7, 1908. Serial No. 431,501.

*To all whom it may concern:*

Be it known that I, DAVID L. LINDQUIST, a subject of the King of Sweden, residing at Yonkers, in the county of Westchester and State of New York, have invented a new and useful Improvement in Alternating-Current Electromagnetic Brake Apparatus, of which the following is a specification.

My invention relates to electromagnetic brake apparatus and one of its objects is the provision of improved and simplified apparatus of this kind in which all lost motion between the magnet armature and brake shoe is taken up before the brake spring is compressed, and considerable energy thereby saved which would otherwise be expended in compressing the brake spring.

A further object of the invention is the provision of such brake apparatus comprising an alternating current magnet.

A further object of the invention is the provision of means for holding stationary or in fixed position the winding of a multiphase alternating current magnet while acting on one or more armatures.

Another object of the invention is to provide a multiphase alternating current magnet having a stationary or fixed winding in combination with movable armatures and means for limiting the inward movement of the armatures so that both will be moved equally.

Other objects of the invention will appear hereinafter, the novel combinations of elements being set forth in the appended claims.

Figure 1:
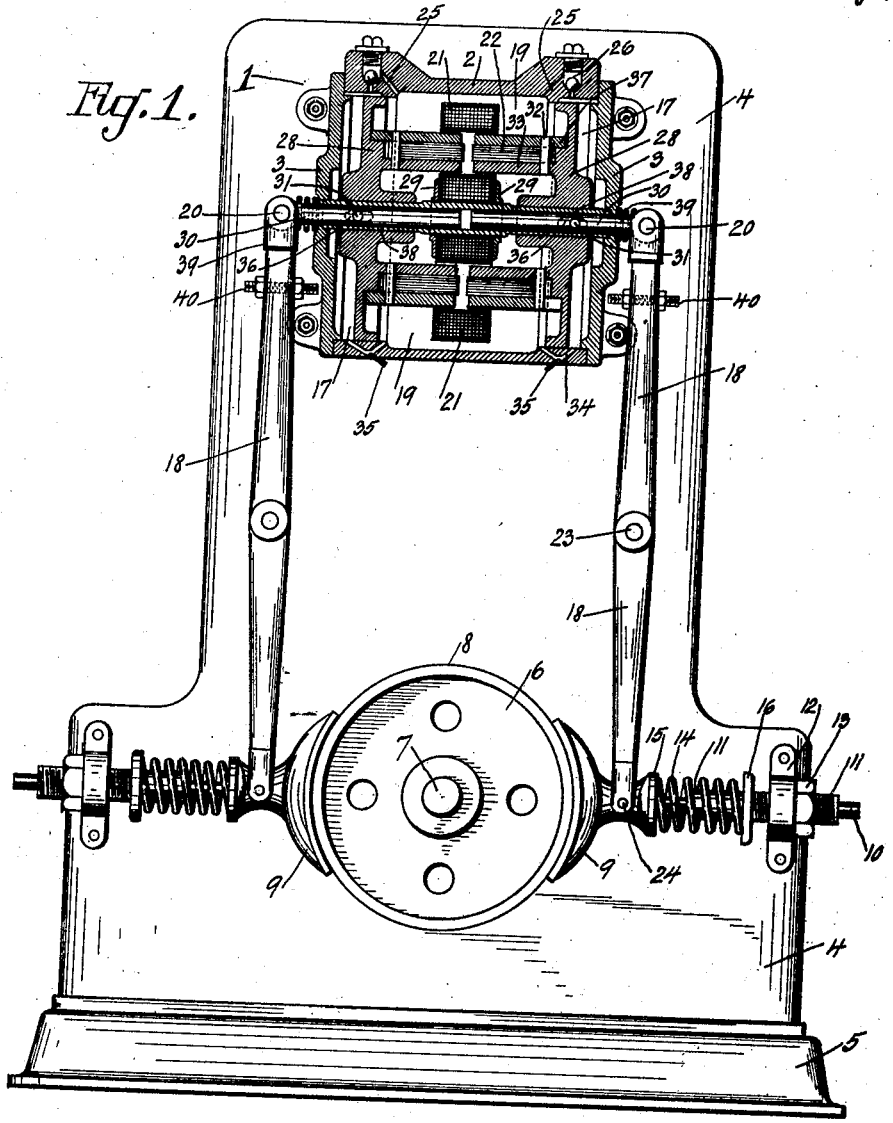
Figure 2:
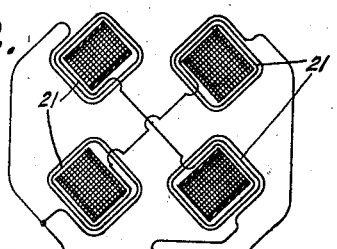

In the accompanying drawing, Figure 1 shows a front elevation of a brake apparatus embodying my invention, and Fig. 2 is a wiring diagram showing the magnet connections.

Referring to Fig. 1, the magnet 1 and the brake apparatus operated thereby are mounted upon a vertical support 4 which rests upon a suitable base 5. A friction pulley or drum 6 is fixed to a shaft 7 which may be connected to any desired apparatus, such as an electric motor. Brake shoes 9 arranged on opposite sides of the pulley 6 are adapted to be moved into and out of frictional contact with the periphery 8 of the pulley. Each brake shoe is provided with a stem 10 which extends through a hollow rod or sleeve 11, and is movable longitudinally therein. The sleeve 11 is externally screw-threaded for a portion of its length for adjustment longitudinally in a correspondingly internally screw-threaded bracket 12 secured to the support 4. By means of a nut 13, the sleeve 11 may be clamped in its adjusted position.

A compression spring 14 surrounds the stem 10 and bears at its ends against a shoulder 15 formed on the brake shoe, and a flange 16 secured to the sleeve 11. This spring normally presses the brake shoe against the periphery 8 of the pulley 6, the pressure being regulated by adjusting the position of the sleeve 11.

The alternating current magnet 1 is of special construction for the purposes hereinafter specified. This magnet is connected through the levers 18 to the brake shoes 9 at 24, the levers themselves being pivoted to the upright 4 at 23. The magnet 1 comprises an outer shell or casing 2 which is provided with tightly fitting heads 3, 3 at the ends, by means of which the magnet 1 may be secured to the upright 4. At each end of the casing 2 is arranged a piston 28 which has a limited horizontal movement therein. These pistons are similar in construction and each comprises a body portion 28 provided with extensions 33 to which are secured by means of dowel pins 32 the plates 37 and laminations 22. The extensions 33, plates 37 and laminations 22 together form a multiple armature which is shown in end view in Fig. 2. In the magnet construction illustrated, there are two of these multiple armatures, each having four projections. While this is the preferred number, I sometimes use a magnet having more or less than eight such projections or armature pole pieces.

Each piston 28 is slidably mounted upon a sleeve 38 which extends the full length of the interior of the magnet 1 and is held in fixed or stationary position therein by being countersunk into the heads 3, 3. The pistons 28, 28 are operatively connected with the brake levers 18, 18 by means of the rods 30, 30 to which they are rigidly fastened by means of pins 31, the latter passing through slots 36 cut in opposite sides of the sleeve 38 so as to allow for horizontal movement of the piston along the fixed sleeve 38. The armature pole pieces connected to one piston are arranged so as to register with the armature pole pieces of the other piston, and the spaces between adjacent armatures are the air gaps. Each pair of adjacent pole pieces is surrounded by a magnet winding 21 which is held stationary upon the sleeve 38 by means of clamp washers 29, 29 which bear against opposite sides of the magnet spools containing the windings.

The pistons 28, 28 in the casing 2 divide the interior of the latter into three chambers, 17, 17 and 19, all of which are preferably filled with some suitable insulating fluid, such as oil or glycerin. The central chamber 19 is in communication with the end chambers 17, 17 through the passages 25 and 34. The passages 25 allow said insulating fluid at all times to freely pass from the end chambers 17 into the central chamber 19, but does not permit the fluid to pass in the opposite direction, owing to the ball check valve 26. The lower passage 34 also connects the chambers 17 and 19 and permits a flow of fluid in either direction, a throttling plug 35 being provided for this passage, by means of which the flow therethrough may be regulated as desired.

The operation of the entire construction as illustrated in the drawing is as follows: Upon sending current from a suitable source of current supply through the leads $a$, $b$, $c$ (see Fig. 2) into the solenoids 21, all of the pole pieces are energized, and adjacent pole pieces tend to move toward each other with a sudden or quick movement. By reason of the check valves 26, 26, however, the insulating fluid which is confined in the casing 19 must pass through the restricted passages 34, 34, and by varying the size of these restricted passages such movement may be regulated as desired. Now, when the electromagnet is energized and the pole pieces are brought toward each other, the brake springs 11 will be compressed and the brake shoes 9 released from the brake pulley 6 so that the latter is free to rotate. Upon the deënergization of the electromagnet, the springs 11 will forcibly apply the brake shoes 9 to the periphery of the brake pulley 6 and thereby bring the latter to rest. Upon such application of the brake shoes, the pistons 28, 28 and connected parts will be moved back to normal position, and by reason of the check valves 26, 26 now being opened by the fluid flowing through the passages 25, 25, and 34, 34, such movement will be comparatively free. It will thus be seen that when the magnet is energized the movements of the parts toward each other will be retarded by reason of the automatic closure of the check valves compelling the fluid to flow through the restricted passages. But on the return movement when the magnet is deënergized, the check valves will be automatically opened and the fluid will have a comparatively free flow through the passages before pointed out from the outer sides of the pistons to the inner sides.

It will be seen that as soon as the magnet is energized and the magnetized parts move together, all lost motion which might exist in the mechanical connections between the magnet pistons or armatures and the brake shoes, is first taken up before the shoes themselves are moved outwardly against the action of the brake springs 11. In this manner the brake springs are merely compressed by the magnet an amount just sufficient to release the brake shoes from engagement with the brake pulley. Therefore, the work done by the magnet is substantially all useful work without unnecessary compression of the brake springs.

I am aware of the application of August Sundh, No. 398,966, filed October 24, 1907, for an improvement in brake apparatus, and do not claim anything therein disclosed.

It should be noted that the winding of the electromagnet is mounted in fixed or stationary position, and therefore it receives little or no vibration, whereas, if it had to move with part of the brake apparatus, it would soon be deranged or ruined. This is for the reason that when a multiphase alternating current magnet receives current it operates its armature very suddenly, and the oil dash-pot mechanism shown is not sufficient to entirely prevent this.

Where two opposing armatures are used as illustrated, it may sometimes happen that one is moved farther than the other and the magnetic circuit of the magnet is closed before both the brake shoes are released. I therefore provide short strong springs 39, 39 encircling the rods 30, 30 between the end face plates 3, 3 and the pivots 20, 20. These springs are of such size and strength that they assist the dash-pot mechanism in cushioning the movements of the armatures and may be compressed to such an extent as to act as positive stops to limit the inward movements of the armatures. After the armatures touch each other the springs will center thereon and remain partially compressed. This insures substantially the same distance of travel for each armature and equal movement of the brake shoes. These springs 39 also serve, together with the dash-pot mechanism, to reduce or entirely eliminate the loud slamming noise that usually occurs in the operation of an alternating current magnet of this type, owing to its quick and powerful action when energized. The springs further serve to effectually overcome the residual magnetism and assist the main brake springs in giving a quick start to the brake shoes in applying the latter. I may also provide adjustable set-screws 40, 40 in the upper ends of the levers 18, 18 to limit the movement of the latter by striking against the face plates 3, 3. When these set-screws are used, the springs 39, 39 need not be compressed solid or they may be omitted.

Obviously those skilled in the art may make various changes in the details and arrangement of parts without departing from the spirit and scope of my invention as defined by the claims, and I wish therefore not to be limited to the precise construction herein disclosed.

What I claim is:—

1. In brake apparatus, the combination with a multiphase alternating current electromagnet with its winding in stationary or fixed position, of armatures associated with said winding and movable toward and away from each other, means comprising springs under tension for limiting the movement of said armatures toward each other to compel each to move through substantially the same distance, and positive stops for limiting the movement of the said armatures toward attracted position.

2. In brake apparatus, the combination with a multiphase alternating current electromagnet having windings mounted in stationary or fixed position, of armatures movable toward each other upon excitation of said windings, and springs under tension for cushioning said movements of the armatures and compelling them each to move through substantially the same distance, and positive stops for limiting the movement of said armatures toward attracted position.

3. In brake apparatus, the combination with a multiphase alternating current electromagnet having windings mounted in substantially fixed or stationary position, of armatures acted upon by said windings when excited with electric current to move toward each other, means comprising springs under compression for positively limiting the inward movements of said armatures, appliances for retracting said armatures to initial positions when said windings are unexcited, and positive stops for limiting the movement of said armatures toward attracted position.

4. In brake apparatus, the combination with an electromagnet, of armatures movable toward and away from each other, means for retarding the movement of said armatures toward each other, appliances comprising springs under compression for limiting the last named movement, brake members positively connected to said armatures, means acting directly on said brake members for applying the brake upon the deenergization of the electro-magnet, and adjustable stops adapted to limit the movement of said armatures toward attracted position.

In testimony whereof, I have signed my name to this specification in the presence of two subscribing witnesses.

DAVID L. LINDQUIST.

Witnesses:
CHAS. M. NISSEN,
JAMES D. IVERS.

---

Copies of this patent may be obtained for five cents each, by addressing the "Commissioner of Patents, Washington, D. C."